US012613873B2

(12) United States Patent
Narasimha et al.

(10) Patent No.: US 12,613,873 B2
(45) **Date of Patent: *Apr. 28, 2026**

(54) MEDIA NAMES MATCHING AND NORMALIZATION

(71) Applicant: The Nielsen Company (US), LLC, New York, NY (US)

(72) Inventors: Goli Reddy Narasimha, Tampa, FL (US); Gangadhar Jakkula, Tampa, FL (US); Tejas Desai, Chicago, IL (US); Amudha Colaco, Oldsmar, FL (US); Steven L. Glickman, Chicago, IL (US); Punil Patel, Oldsmar, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/628,318

(22) Filed: Apr. 5, 2024

(65) Prior Publication Data

US 2024/0248903 A1 Jul. 25, 2024

Related U.S. Application Data

(63) Continuation of application No. 17/991,499, filed on Nov. 21, 2022, now Pat. No. 11,966,404, which is a
(Continued)

(30) Foreign Application Priority Data

Dec. 17, 2015 (IN) ........................... 4148/DEL/2015

(51) Int. Cl.
*G06F 16/00* (2019.01)
*G06F 16/2457* (2019.01)
(Continued)

(52) U.S. Cl.
CPC ...... *G06F 16/24578* (2019.01); *G06F 16/437* (2019.01); *H04N 21/235* (2013.01);
(Continued)

(58) Field of Classification Search
CPC ........... G06F 16/437; G06F 16/424578; G06F 16/43; G06F 16/285; G06F 16/41;
(Continued)

(56) References Cited

U.S. PATENT DOCUMENTS

| | | | |
|---|---|---|---|
| 8,370,489 B2 * | 2/2013 | Mazumdar | .............. H04L 43/04 709/224 |
| 8,413,187 B1 * | 4/2013 | Del Sesto | .......... H04N 21/2355 725/54 |

(Continued)

*Primary Examiner* — Monica M Pyo

(57) ABSTRACT

Methods and apparatus to facilitate matching of names for same media content are disclosed. Example methods include analyzing first data associated with first media content and, when a program name/identifier and/or episode name/identifier is not identified in the first data, supplementing the data with second data to form third data and processing the third data with respect to fourth data associated with second media content and calculating a composite match score including a program match score and an episode match score based on processing the third data with respect to the fourth data. When the first media content is determined to match the second media content based on the processing of the third data with respect to the fourth data and a comparison of the composite match score to a threshold is satisfied, a normalized media name is generated for the first media content and the second media content.

20 Claims, 10 Drawing Sheets

Related U.S. Application Data continuation of application No. 16/806,743, filed on Mar. 2, 2020, now Pat. No. 11,507,588, which is a continuation of application No. 15/229,684, filed on Aug. 5, 2016, now Pat. No. 10,579,628.

(51) Int. Cl.

| | |
|---|---|
| *G06F 16/435* | (2019.01) |
| *H04N 21/235* | (2011.01) |
| *H04N 21/25* | (2011.01) |
| *H04N 21/278* | (2011.01) |
| *H04N 21/8352* | (2011.01) |
| *H04N 21/84* | (2011.01) |
| *G06F 16/28* | (2019.01) |
| *G06F 16/41* | (2019.01) |
| *G06F 16/43* | (2019.01) |

(52) U.S. Cl.
CPC ......... *H04N 21/251* (2013.01); *H04N 21/278* (2013.01); *H04N 21/8352* (2013.01); *H04N 21/84* (2013.01); *G06F 16/285* (2019.01); *G06F 16/41* (2019.01); *G06F 16/43* (2019.01)

(58) Field of Classification Search
CPC .. H04N 21/235; H04N 21/251; H04N 21/278; H04N 21/8352; H04N 21/84
USPC .......................................................... 707/748
See application file for complete search history.

(56) References Cited

U.S. PATENT DOCUMENTS

| | | | | |
|---|---|---|---|---|
| 8,578,404 | B2 * | 11/2013 | McMillan .............. | H04H 60/43 |
| | | | | 713/168 |
| 8,665,952 | B1 * | 3/2014 | Grange .................. | H04N 19/44 |
| | | | | 382/233 |
| 8,925,024 | B2 * | 12/2014 | Wright .............. | H04N 21/4402 |
| | | | | 725/105 |
| 9,398,350 | B1 * | 7/2016 | Ong ......................... | G06F 16/71 |
| 2013/0311408 | A1 * | 11/2013 | Bagga ................... | G06Q 30/02 |
| | | | | 706/12 |
| 2016/0150280 | A1 * | 5/2016 | Cui .................. | H04N 21/25891 |
| | | | | 725/14 |
| 2017/0031916 | A1 * | 2/2017 | Sayyadi-Harikandehei ................ |
| | | | | G06F 16/335 |

* cited by examiner

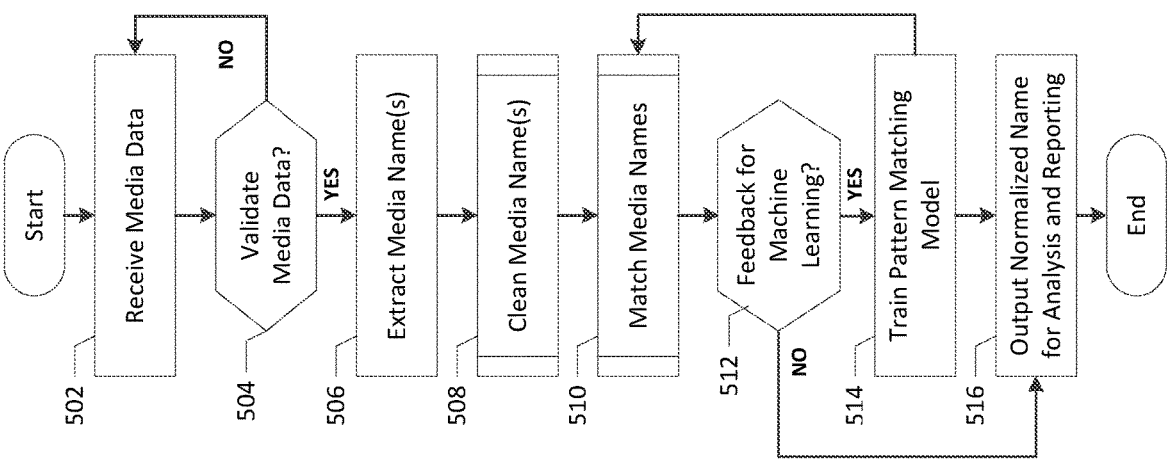
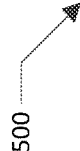
Start
502 — Receive Media Data
504 — Validate Media Data?     NO     YES
506 — Extract Media Name(s)
508 — Clean Media Name(s)
510 — Match Media Names
512 — Feedback for Machine Learning?     NO     YES
514 — Train Pattern Matching Model
516 — Output Normalized Name for Analysis and Reporting
End
500
FIG. 5

| PROG MATCH SCORE (802) | EPISODE MATCH SCORE (804) | TV_ORIG_ID (806) | TV ORIG NAME (808) | DIGITAL_PROGRAM_NAME (810) | DIGITAL_EPISODE_ID (812) | DIGITAL_EPISODE_NAME (814) | AFF PROG ID (816) | AFF EPISODE ID (818) | AFF PROG NAME (820) | AFF EPISODE NAME (822) |
|---|---|---|---|---|---|---|---|---|---|---|
| 100% | 0% | 45 | ATV | FORENSICS | 3276479 | FORENSICS:- WOBBLY MURDER – S15E8 | SH77057 | N/A | FORENSICS | N/A |
| 100% | 0% | 45 | ATV | FORENSICS | CID=3276479 | FORENSICS:- WOBBLY MURDER | SH77057 | N/A | FORENSICS | N/A |
| 100% | 0% | 45 | ATV | FORENSICS | PFMTN3VK | FORENSICS:- WOBBLY MURDER | SH77057 | N/A | FORENSICS | N/A |
| 100% | 95% | 45 | ATV | FORENSICS | 1442030 | FORENSICS:- THE DEFENDANT'S TURN – S3E2 | SH77057 | EP77058 | FORENSICS | THE DEFENDANT'S TURN |
| 100% | 85% | 45 | ATV | FORENSICS | CID=1442030 | FORENSICS:- THE DEFENDANT'S TURN | SH77057 | EP77058 | FORENSICS | THE DEFENDANT'S TURN |
| 100% | 85% | 45 | ATV | FORENSICS | EFCP2WOH | FORENSICS:- THE DEFENDANT'S TURN | SH77057 | EP77058 | FORENSICS | THE DEFENDANT'S TURN |

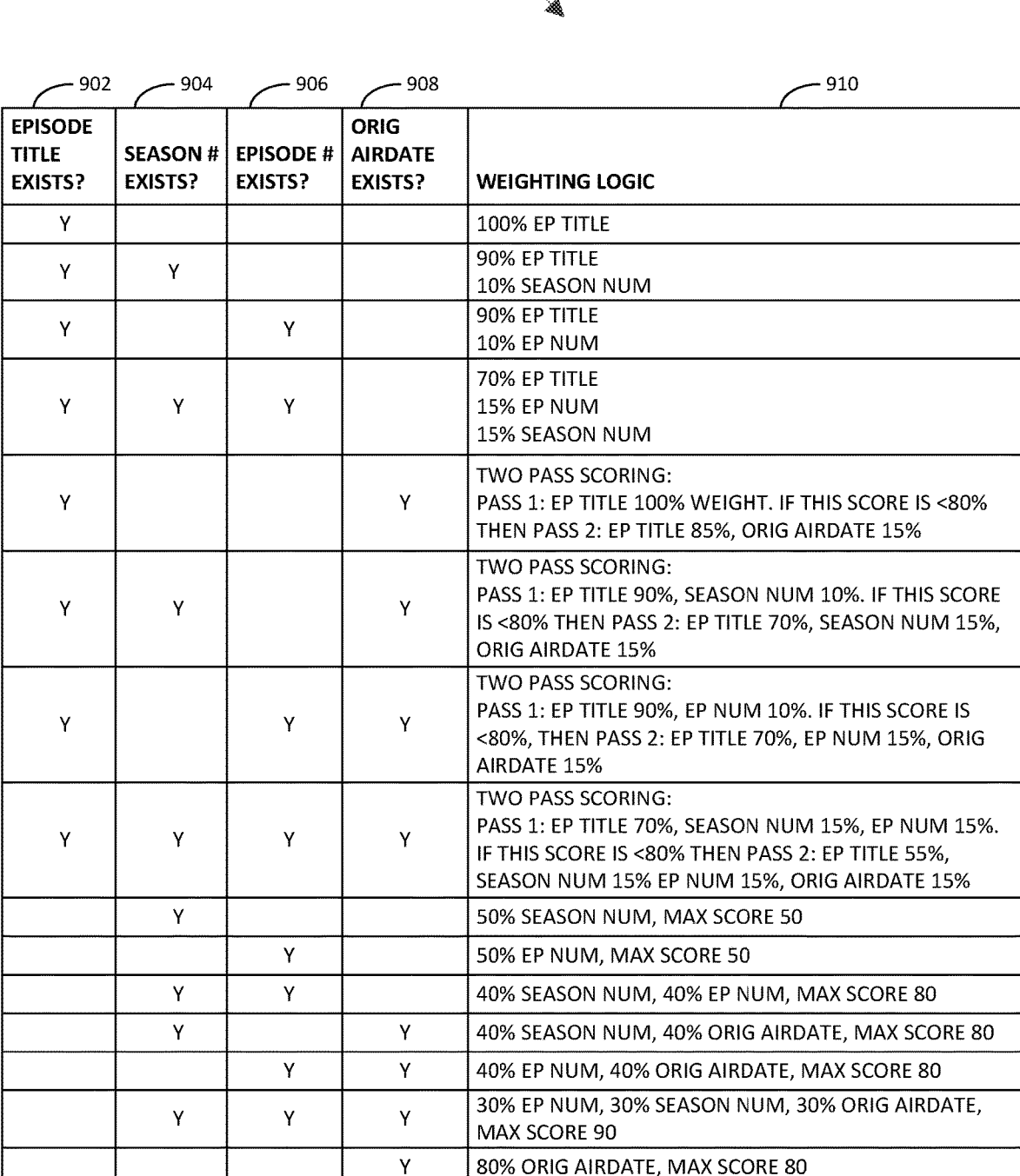

| EPISODE TITLE EXISTS? | SEASON # EXISTS? | EPISODE # EXISTS? | ORIG AIRDATE EXISTS? | WEIGHTING LOGIC |
|---|---|---|---|---|
| Y | | | | 100% EP TITLE |
| Y | Y | | | 90% EP TITLE<br>10% SEASON NUM |
| Y | | Y | | 90% EP TITLE<br>10% EP NUM |
| Y | Y | Y | | 70% EP TITLE<br>15% EP NUM<br>15% SEASON NUM |
| Y | | | Y | TWO PASS SCORING:<br>PASS 1: EP TITLE 100% WEIGHT. IF THIS SCORE IS <80% THEN PASS 2: EP TITLE 85%, ORIG AIRDATE 15% |
| Y | Y | | Y | TWO PASS SCORING:<br>PASS 1: EP TITLE 90%, SEASON NUM 10%. IF THIS SCORE IS <80% THEN PASS 2: EP TITLE 70%, SEASON NUM 15%, ORIG AIRDATE 15% |
| Y | | Y | Y | TWO PASS SCORING:<br>PASS 1: EP TITLE 90%, EP NUM 10%. IF THIS SCORE IS <80%, THEN PASS 2: EP TITLE 70%, EP NUM 15%, ORIG AIRDATE 15% |
| Y | Y | Y | Y | TWO PASS SCORING:<br>PASS 1: EP TITLE 70%, SEASON NUM 15%, EP NUM 15%. IF THIS SCORE IS <80% THEN PASS 2: EP TITLE 55%, SEASON NUM 15% EP NUM 15%, ORIG AIRDATE 15% |
| | Y | | | 50% SEASON NUM, MAX SCORE 50 |
| | | Y | | 50% EP NUM, MAX SCORE 50 |
| | Y | Y | | 40% SEASON NUM, 40% EP NUM, MAX SCORE 80 |
| | Y | | Y | 40% SEASON NUM, 40% ORIG AIRDATE, MAX SCORE 80 |
| | | Y | Y | 40% EP NUM, 40% ORIG AIRDATE, MAX SCORE 80 |
| | Y | Y | Y | 30% EP NUM, 30% SEASON NUM, 30% ORIG AIRDATE, MAX SCORE 90 |
| | | | Y | 80% ORIG AIRDATE, MAX SCORE 80 |

FIG. 9

MEDIA NAMES MATCHING AND NORMALIZATION

CROSS-REFERENCE TO RELATED APPLICATIONS

The present application is a continuation of and claims the benefit of priority to U.S. patent application Ser. No. 17/991,499, now U.S. Pat. No. 11,966,404, filed on Nov. 21, 2022, which claims priority to U.S. patent application Ser. No. 16/806,743, now U.S. Pat. No. 11,507,588, filed on Mar. 2, 2020, entitled "MEDIA NAMES MATCHING AND NORMALIZATION," which claims priority to U.S. patent application Ser. No. 15/229,684, now U.S. Pat. No. 10,579,628, filed on Aug. 5, 2016, entitled "MEDIA NAMES MATCHING AND NORMALIZATION," which claims the benefit of priority from Indian patent application No. 4148/DEL/2015, filed on Dec. 17, 2015, entitled "TELEVISION MEDIA NAMES MATCHING NORMALIZATION", each of which is hereby incorporated herein in their entireties.

FIELD OF THE DISCLOSURE

This disclosure relates generally to audience measurement, and, more particularly, to media names matching and normalization.

BACKGROUND

Media companies and advertisers are interested in tracking a number of times audience members are exposed to media content (e.g., television programs, movies, radio programs, Internet videos, etc.). Traditionally, audience measurement entities determine audience engagement by monitoring names of media content accessed by consumers. However, media content can be accessed across different media platforms (e.g., cable, broadcast, syndication, video on demand (VOD), digital, etc.), and a program name from one platform may have a different program name than the same media from a different platform. The difference in program names results in inaccurate reporting of program name access by consumers.

BRIEF DESCRIPTION OF THE DRAWINGS

FIGS. 5-7 are flowcharts representative of example machine readable instructions that may be executed to implement the example systems of FIGS. 1-3.

FIG. 8 illustrates an example mapping generated according to FIGS. 1-7.

FIG. 9 illustrates an example weighting and criteria for pattern matching of media content according to FIGS. 1-8.

DETAILED DESCRIPTION

Figure 1:
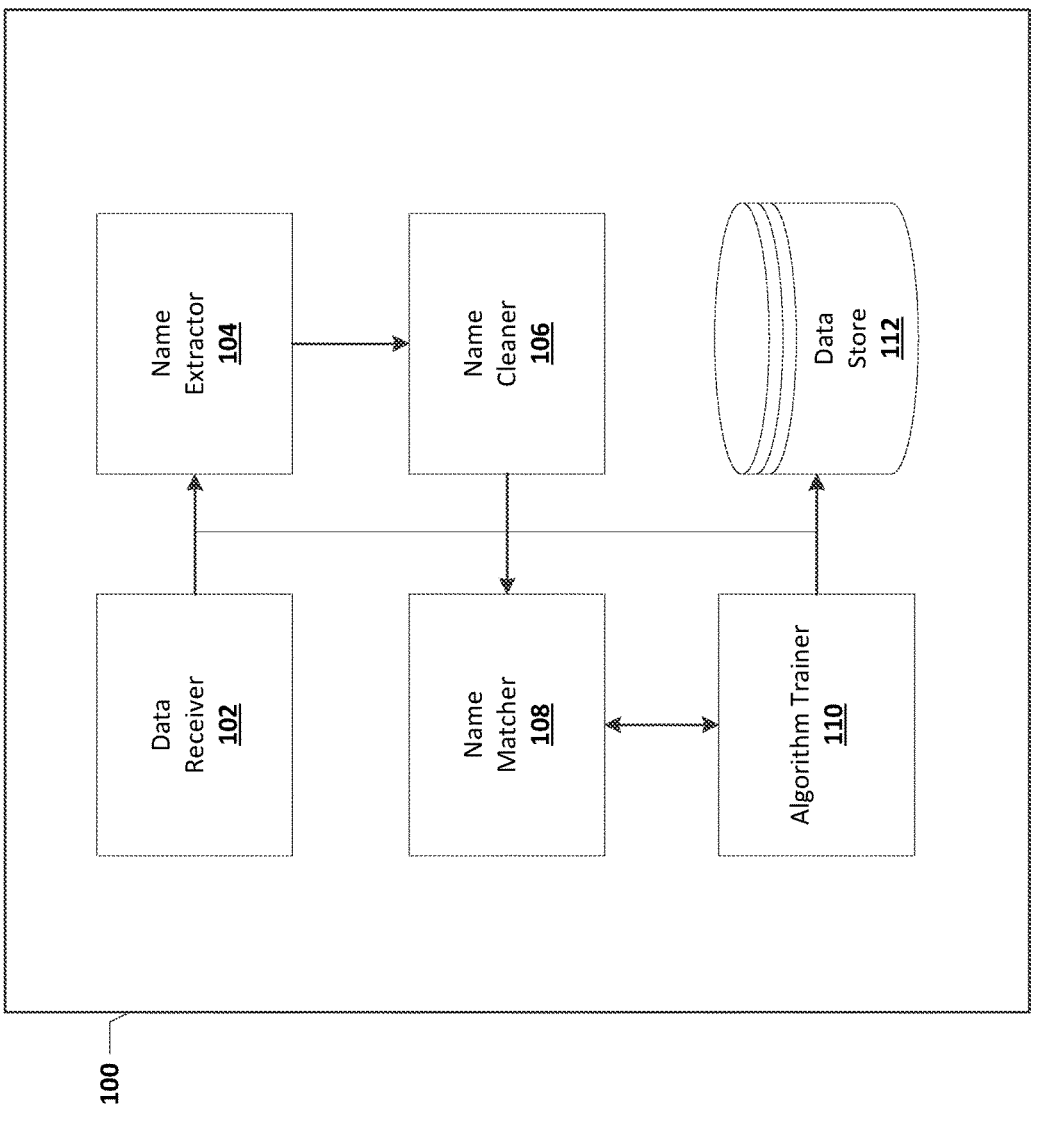
FIG. 1 is a block diagram of an example apparatus that may be used to match and normalize media names.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Media content is distributed and consumed across fragmented media including television (TV) networks (e.g., broadcast, cable, syndicated), VOD, and on digital media with Over the Top (OTT) providers. In certain examples, Total Content Ratings (TCR) provides a combined audience measurement for video and/or other media content consumption across platforms. TCR is a component included in Total Audience Measurement (TAM). For a given program (e.g., television media content, etc.), TCR provides combined audience exposure and provides insights into audience reach as consumed on multiple platforms including, for example, television, computer and mobile.

In some examples, TCR provides television media content measurement based on an original broadcast date and a certain number of subsequent days of viewing (e.g., three days, seven days, ten days, etc.). In some examples, TCR uses one or more data collection sources related to television (e.g., Active/Passive (AP) System, National Panel Meters (NPM), Local People Meters (LPM), etc.), Digital (Content Management System (CMS), ID3, etc.), big-data, etc., to provide a combined rating by various platforms, device types and/or TV source.

However, consolidated audience reach metrics across fragmented media can be inaccurate due at least in part to duplicated content labeled according to different names. Currently, media content reporting is based on program names supplied by a customer to according airing of the program (e.g., television program air time). However, the content itself is not identified at an episode level. In certain examples, cross-platform audience measurement is facilitated through identification of media content at an episode level to normalize program names and identify content uniquely across television and other digital content viewing systems. The same media content can be provided using different names and/or identifiers when provided via multiple media platforms. Certain examples match and normalize media names across viewing platforms to determine audience reach across fragmented media.

Example methods and apparatus disclosed herein facilitate media (e.g., cross-platform media) names (e.g., titles) matching and normalization. Example methods disclosed herein include (1) receiving program and episode data for media, (2) extracting linear media name(s) from the received data, (3) extracting video-on-demand media name(s) from the received data, (4) extracting digital name(s) from the received data, (5) applying pattern matching techniques on the extracted names and the received data to normalize one name for each of the media, and (6) training a machine learning algorithm to perform the pattern matching. In some examples, if a piece of media is not normalized via the pattern matching, a user may manually normalize the media.

Examples disclosed herein match and normalize media to support cross-platform total audience measurement. In some examples, media reporting is based on the media names supplied by a customer (e.g., to the minute of the media). In some such examples, however, the media is not identified at the episode level. In such instances, to provide cross-platform measurement, identifying the media and normalizing the name uniquely across television and digital systems is needed. For example, when developing total content ratings, media across multiple distribution methods, distributors and digital systems is to be linked.

To that end, examples disclosed herein build (e.g., develop) linkage variables to link media names and digital media names. In some examples, the linkage variables are used to build an algorithm (e.g., a service) to normalize media names across different types of distribution media and/or platforms, such as, but not limited to, cable, broadcast, syndication, video-on-demand (VOD) and/or digital streams. Furthermore, example techniques disclosed herein provide unduplicated (e.g., de-duplicated) total audience measurement for media across platforms (e.g., mobile devices, desktop computers, etc.) and/or distributors (e.g., cable, broadcast, streaming, etc.).

Examples disclosed herein develop a reusable names standard and mapping service to standardize media names across platforms, distributors and distribution types. In some examples, the reusable names standard and mapping service utilizes published media schedules (e.g., television airing schedules) and/or metadata as reference data and compares additional input information with the reference data. In some examples, a matching score is calculated based on one or more rules and/or thresholds. In some examples, the rules and/or thresholds may be included as a service to facilitate reusability.

FIG. 1 is a block diagram of an example apparatus I 00 that may be used to match and normalize media (e.g., cross-platform) names. The example apparatus 100 of FIG. 1 is implemented by an audience measurement entity such as The Nielsen Company (US), LLC. The example apparatus 100 of FIG. 1 includes an example data receiver 102, an example name extractor 104, an example name cleaner 106, an example name matcher 108, an example algorithm trainer!10, and an example data store 112.

The example data receiver 102 of FIG. 1 receives media content (e.g., a television program, etc.), program data, and episode data for the media content. For example, the data receiver 102 may receive television-broadcast program/episode data, television-cable program/episode data, television-syndicated program/episode data, video-on-demand program/episode data, digital Content Management System (CMS) tagged program/episode data for television (TV) media, etc., from one or more monitors, sensors, detectors, etc., associated with a media content delivery platform or presentation device (e.g., TV, set top box, monitoring and/or metering device, etc.).

The example name extractor 104 of FIG. 1 extracts meta-data (e.g., media names) from received program data and/or episode data provided by the data receiver 102. For example, the name extractor 104 may extract television media names, video-on-demand media names, digital media names, etc., from data received by the example data receiver 102. In some examples, the name extractor 104 may record the extracted name(s) in the example data store 112, as well as provide the names to the name cleaner 106.

Figure 2:
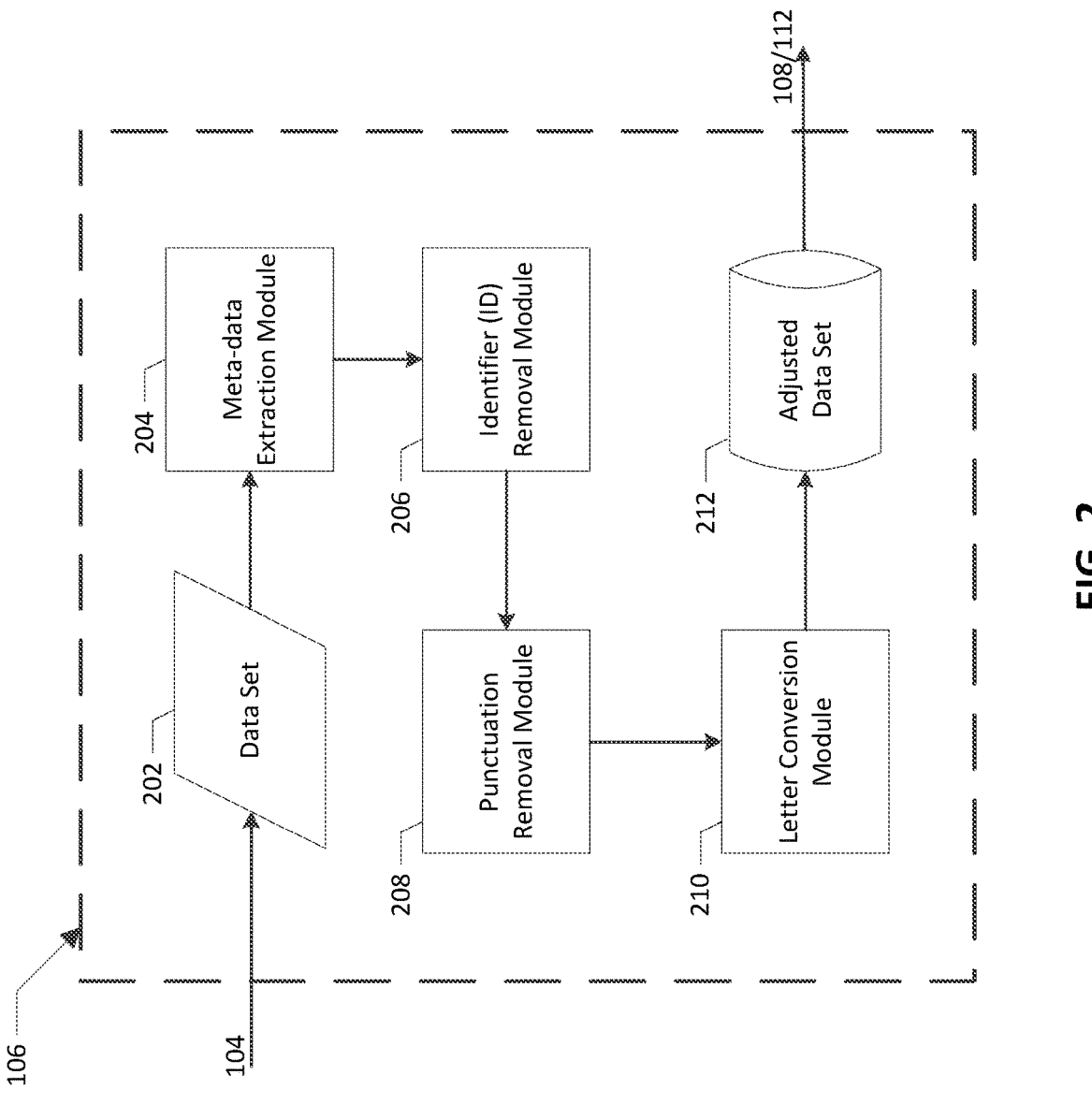
FIG. 2 illustrates further detail regarding an example implementation of the name cleaner of FIG. 1.

The example name cleaner 106 of FIG. 1 cleans (e.g., normalizes, standardizes, alters, etc.) the program names and episode names across different types of media distribution platforms. For example, the name cleaner 106 may clean linear television media names, video-on-demand media names, digital media names, etc., from data extracted by the example name extractor 104. As used herein, linear media corresponds to media that airs at a specific data and time. In contrast, non-linear media corresponds to media that is released in, for example, a video-on-demand (VOD) platform and is not associated with a telecast at a specific data and time. In the illustrated example of FIG. 1, the name cleaner 106 applies clean-up rules to normalize the program data and episode data, which improves matching accuracy. In some examples, the name cleaner 106 cleans media names across one or more content distributors (e.g., cable, broadcast, syndication, VOD, digital, etc.). In certain examples, additional information (e.g., program data, episode data, etc.) received by the data receiver 102 can also be used to help clean the names of received media. The example apparatus of FIG. 2 provides additional and/or related detail regarding the apparatus of the names cleaner 106.

The example name matcher 108 of FIG. 1 matches program names and/or episode names from the name cleaner 106 based on identified media names to obtain a common, normalized media name for the data files. In the illustrated example of FIG. 1, the name matcher 108 applies pattern matching models/techniques (e.g., fuzzy logic, machine learning, etc.) on the media obtained from the name cleaner 106. The name matcher 108 pairs media that contain similar program data and/or episode data creating a new, normalized media name. As used herein, similar data corresponds to media names containing the same identifiable episode name, as identified by the name cleaner 106.

In the illustrated example of FIG. 1, the name matcher 108 identifies similar media across fragmented media (e.g., multiple devices where media is consumed such as tablets, smart phones, over-the-top devices, etc.) which have names normalized or cleaned by the name cleaner 106. In some examples, the name matcher 108 automatically obtains a normalized or "cleaned" media name. For example, the name matcher 108 may utilize a pattern matching algorithm to match media across one or more dimensions (e.g., characteristics) via one or more fuzzy logic algorithms (e.g., matching based on several criteria according to degrees of truth rather than a binary true or false such as evidenced by a confidence score). A combination of one or more fuzzy logic algorithms can be leveraged, including Dice-Coefficient, Levenshtein distance, Jara-Winkler distance, and Longest Common Subsequence, for example.

Fuzzy logic, for example, is a form of many-valued logic in which a true value of a variable may be any real number between 0 and 1. In contrast, with Boolean logic, the true value of a variable may only be 0 or 1. Fuzzy logic can also accommodate the concept of partial truth, where the truth value for a variable may range between completely true and completely false. Fuzzy logic can take into account a plurality of factors to determine whether a proposition (e.g., two names represent the same media content) is likely true.

In some examples, the name matcher 108 may enable a user to manually obtain the normalized media name for particular media if, for example, the name matcher 108 is unable to apply one or more pattern matching techniques and/or the pattern matching techniques do not yield a normalized or otherwise cleaned name. In some examples, the name matcher 108 sends the normalized media names to the example algorithm trainer 110.

Figure 3:
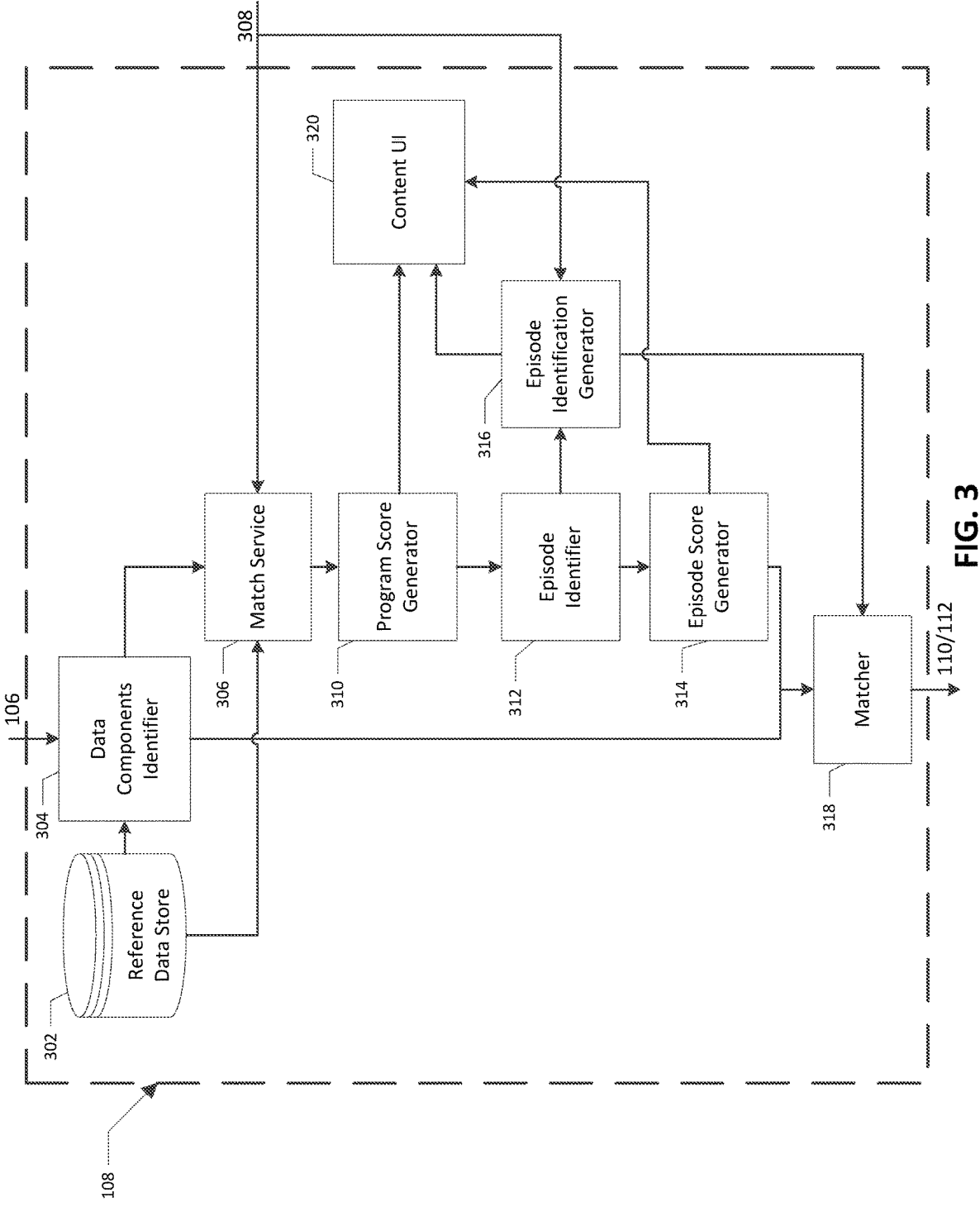
FIG. 3 illustrates further detail regarding an example implementation of the name matcher of FIG. 1.

The example name matcher 108 further assigns a confidence score to the matched data files containing a normalized media name. For example, the name matcher 108 may assign a number(s) to a normalized data file name based on the similar content in the paired media. In some examples, the confidence score contains two numbers, a program match score and an episode match score. The program match score corresponds to similar program content in the paired media data of the normalized data file. The episode match score corresponds to similar episode content in the paired media data of the normalized data file. In some examples, the confidence score may be used to classify the normalized data files into one of three categories: a good match, a possible match, and a no match. In some examples, a good match corresponds to a normalized data file with a confidence score greater than or equal to a first threshold (e.g., 65%, 75%, etc.), a possible match corresponds to a normalized data file with a confidence score greater than or equal to a second threshold (e.g., 25%, 35%, etc.) and a no match corresponds to a normalized data file with a confidence score less than the second threshold (e.g., 25%, 35%, etc.). The example apparatus of FIG. 3 provides additional and/or related detail regarding the apparatus of the names matcher 108.

For example, fuzzy logic can be used with pattern matching to determine a weighted confidence score according to the following table:

TABLE 1

| | | |
|---|---|---|
| Exact start time match + Exact Program/ Episode Name match | = | Good Match |
| Exact start time match + Closeness Name match (high threshold) | = | Good Match |
| Exact start time match + Closeness Name match (low threshold) | = | Probable Match |
| Threshold start time match + Exact Program/ Episode Name match | = | Good Match |
| Threshold start time match + Closeness Name match (high threshold) | = | Good Match |
| Threshold start time match + Closeness Name match (low threshold) | = | Probable Match |
| Otherwise | = | No Match |

Thus, in certain examples associated with Table 1, if two media content start at the exact same time and have the same program and/or episode name (e.g., 100%), the names are a good match to be associated with the same media content. If two media content start at the exact same time and have highly similar names (e.g., to a high threshold of 65%, 75%, 85%, 95%, etc.), the names are a good match to be associated with the same media content. If two media content start at the same time but only satisfy a lower threshold of name similarity (e.g., 45%, 55%, 65%, etc.), then the names are a probable match to be associated with the same media content. If two media content have start times within a threshold range of each other (e.g., I minute, 2 minutes, 5 minutes, etc.) and have the exact same program/episode name, then the names are a good match to be associated with the same media content. If two media content have start times within a threshold range of each other (e.g., I minute, 2 minutes, 5 minutes, etc.) and have highly similar names (e.g., to a high threshold of 65%, 75%, 85%, 95%, etc.), the names are a good match to be associated with the same media content. If two media content have start times within a threshold range of each other (e.g., I minute, 2 minutes, 5 minutes, etc.) but only satisfy a lower threshold of name similarity (e.g., 45%, 55%, 65%, etc.), then the names are a probable match to be associated with the same media content. Otherwise, if none of these criteria is satisfied, then the fuzzy logic pattern matching model determines that there is no match.

The example algorithm trainer 110 of FIG. 1 trains a pattern matching model (e.g., a neural network and/or other machine-learning and/or deep learning model, etc.) based on name normalization and matching information from the name cleaner 106 and the name matcher 108, such as described above with respect to Table 1. For example, the algorithm trainer 110 may train a machine-learning algorithm to perform pattern matching based on the matched names (e.g., automatically matched names and/or manually matched names). In certain examples, pattern matching, weight, and associated confidence score can improve over time based on gathered and evaluated media content and associated names data. In certain examples, different pieces of information are associated with different weights and/or weights can be calculated differently as the deep learning network driving the pattern matching model learns from accumulated data and associated observations. The algorithm trainer 110 may store pattern matching model(s) in the data store 112.

The example data store 112 of FIG. 1 is provided to store information received, processed and/or used by the apparatus 100. The example data store 112 of FIG. 1 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example data store 112 may additionally or alternatively be implemented by one or more double data rate (DDR) memories, such as DDR, DDR2, DDR3, mobile DDR (mDDR), etc. The example data store 112 may additionally or alternatively be implemented by one or more mass storage devices such as hard drive disk(s), compact disk drive(s), digital versatile disk drive(s), etc. While, in the illustrated example, the example data store 112 is illustrated as a single database, the example data store 112 may be implemented by any number and/or type(s) of databases. Information stored in the data store 112, such as normalized and matched names, confidence scores, etc., can be provided to one or more external systems for reporting, analysis, etc. (e.g., by an audience measurement entity, content ratings entity, advertiser, etc.).

FIG. 2 illustrates further detail regarding an example implementation of the name cleaner 106 that operates on a data set 202. The example name cleaner 106 in FIG. 1 cleans the program name and/or episode name for media content across different types of media distribution platforms. As shown in the example of FIG. 2, the name cleaner 106 includes a meta-data extraction module 204, an identifier (ID) removal module 206, a punctuation removal module 208, and a letter conversion module 210. The meta-data extraction module 204 receives data from the data set 202 provided by the name extractor 104. The data set 202 may include linear and/or non-linear television media names. The data set 202 may also include other data from the name extractor 104.

The meta-data extraction module 204 edits the data set 202 to extract meta-data. For example, meta-data may correspond to a season number, an episode number, a clip, a preview, etc. In certain examples, the data input from the data set 202 may include information such as an episode name, a program name, and/or an episode ID/program ID.

The identifier (ID) removal module 206 receives data from the meta-dataextraction module 204. The ID removal module 206 removes a program ID and/or an episode ID from the data. For example, a program ID/episode ID may include a series of numbers and/or letters identifying the program or episode.

The punctuation removal module 210 receives data from the ID removal module 206. The punctuation removal module 208 removes punctuation from the data input. Punctuation includes, but is not limited to, any marks (e.g., comma, period, semicolon, parenthesis, etc.) used to separate words.

The letter conversion module 210 receives data from the punctuation removal module 208. The letter conversion module 210 replaces capitalized letters present in the data with the same letter in lowercase form. The converted data is output from the letter conversion module 210 as an adjusted data set 212 for the name matcher 108.

FIG. 3 illustrates further detail regarding an example implementation of the name matcher 108. The example name matcher 108 in FIG. 3 matches program names and/or media names to obtain a normalized media name for the data files. The example name matcher 108 also assigns a confidence score to the matched data files including a normalized media name. In the illustrated example, the name matcher 108 receives media information from the name cleaner 106 as well as a reference data store 302.

The reference data store 302 includes data from one or more disparate data sources related to one or more media services such as cable, broadcast, VOD, syndication, digital, etc. As such, the reference data store 302 can include related data such as TV broadcast program/episode data, TV cable program/episode data, TV syndicated program/episode data, VOD program/episode data, digital CMS tagged program/episode data, etc. In certain examples, the reference data store 302 can be included in, be associated with, and/or be separate from the example data store 112.

In certain examples, the reference data store 302 organizes information to build a digital reference and/or a content ratings reference based on client content information and/or names information. Client content information can include, for example, client ID, channel ID, content/asset ID, episode name, program name, content length, originator ID, global episode ID, original air date, full episode flag, etc. Client content information can be used to build a digital reference including, for example, an episode reference, program reference, brand/sub-brand information, full episode flag, cross-publisher relationship, exception report, etc. Names information can include, for example, episode name, digital ID (e.g., video asset ID, global episode ID, etc.), etc. The digital reference can be used with names information to build a content ratings reference including, for example, originator mapping, normalized reference data, linkages, etc.

Figure 4:
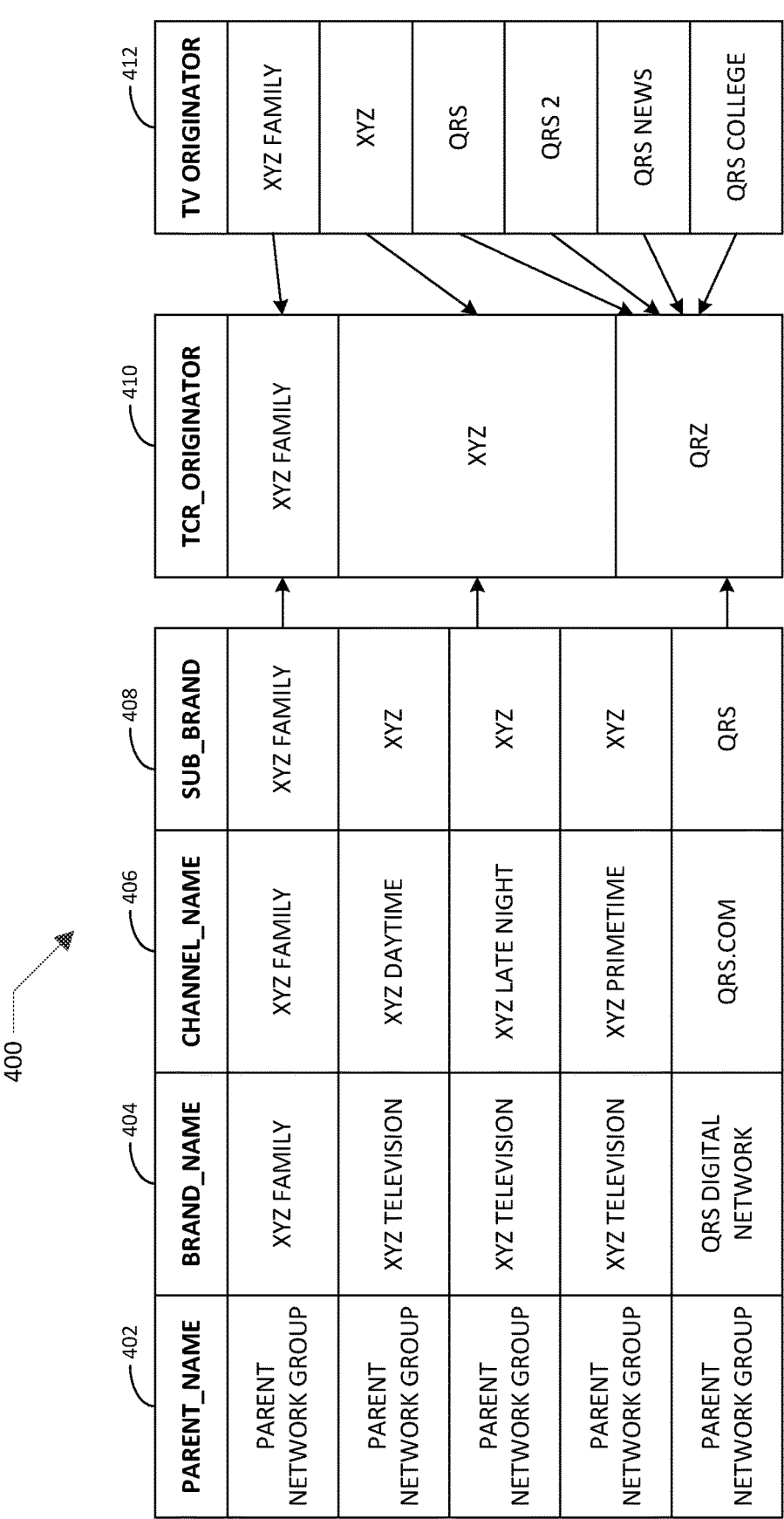
FIG. 4 illustrates an example mapping between media content with respect to originator.

For example, FIG. 4 illustrates an example mapping 400 between TV and digital content with respect to originator and channel. The mapping 400 can be stored and leveraged by the reference data store 302, for example. As demonstrated in the example mapping 400, media content information can be organized according to parent name 402, brand name 404, channel name 406, and sub-brand 408. For an example the parent name 402, such as a parent network group, is associated with one or more brand names 404 (e.g., XYZ Family, XYZ Television, QRS Digital Network, etc.). Each brand 404 is associated with a channel name 406 (e.g., XYZ Family, XYZ Daytime, XYZ Late Night, XYZ Primetime, QRS.com, etc.). A sub-brand 408 is a mapping of one or more channels (e.g., digital channels) such as XYZ Family, XYZ, QRS, etc. The sub-brands 408 map to a total content ratings (TCR) originator 410. For example, a digital content rating sub-brand 408 is a TCR originator 410 superset because a unique audience may not be split apparat or added together to align with one or more TV originators 412. One or more TV originators 412 can be aligned with sub-brands 408 via the TCR originator 410, for example.

In some examples, QRS sub-brand 408 media coming through digital properties are coming across the same digital channel 406. In some such examples, a sub-brand 408 at the TV originator 412 level may be unknown. In the illustrated example of FIG. 4, the TCR may be reported at a QRS total level rather than by channel (e.g., QRS, QRS 2, QRS News, QRS College, etc.). In some examples, QRS may override application level reporting and report at a more granular channel level in Digital, which can allow for more granular level reporting in TCR. Thus, use the mapping 400, networks can be associated with brands, channels, sub-brands, etc., such that an identification of one item leads to the identification of other associated items including the content originator 410.

Information from the reference data store 302 and the name cleaner 106 is received by a data components identifier 304. The data components identifier 304 identifies data components within the media. Data components include but are not limited to a network originator identifier, a program name identifier, and an episode name identifier. Media determined by the data components identifier 304 to include a network originator identifier, a program name identifier, and an episode name identifier are sent to the matcher 318.

For example, the mapping 400 can be used to relate measured content impressions to corresponding platform, digital rights holder, etc. Information in the mapping 400 can be used by the data components identifier 304 to correlate incoming program and/or episode name information with content originator 410 and/or other mapping 400 information. If content originator 410, program name, and episode name are provided to the data components identifier 304, the data components identifier 304 sends the information to the matcher 318 to finalize a match and name normalization between multiple content items.

Media received by the matcher 318 are assigned a normalized name to identify the media content. If, however, media is determined not to include a network identifier, a program name identifier, and an episode name identifier are sent to a match service 306. The match service 306 obtains data components for the media by leveraging the reference data store 302 and/or through an affiliated provider 308 (e.g., Gracenote, Cognitive Networks, Digimarc, Shazam, etc.), converting the media into linear media data. In some examples, the match service 306 overrides the data components with content ratings data including a network originator identifier and a program name identifier. The match service 306 batches the data and performs pattern matching on the data to pair matching data including similar patterns, characteristics, etc.

A program score generator 310 assigns a program match score to each pair of matched data. As used herein, "program match score" refers to a comparison between a first linear or non-linear media's program name and a second linear or non-linear media's program name, represented in the form of a percentage, for example. A higher percentage represents a higher degree of similarity between the first media's program name and the second media's program name. Program match scores that meet and/or exceed a threshold are sent to an episode identifier 312. Program match scores greater than or equal to 65%, for example, meet the threshold and are sent to the episode identifier 312. Program match scores less than 65%, for example, and/or having a score of greater than or equal to 65% with respect to multiple pieces of media, for example, do not meet the threshold and are sent to the content user interface (UI) 320 where the media can be manually adjusted.

The episode identifier 312 analyzes the media to determine if the matched media includes an episode name identifier (e.g., based on information collected by an audience measurement entity). Media including an episode name identifier is sent to an episode score generator 314. Media that does not include an episode name identifier is sent to an episode identification generator 316.

The episode identification generator 316 analyzes the media to determine whether media data includes an episode content identifier corresponding to a given network originator identifier and program name identifier. If an episode content identifier correlating to the given network originator identifier and program name identifier is found (e.g., leveraging Gracenote, Cognitive Networks, Digimarc, Shazam, etc.), the information is sent to a matcher 318 to provide a normalized media name to identify the media. Otherwise, information is sent to the content UI 320 where it can be manually adjusted.

The episode score generator 314 assigns an episode match score to each pair of matched media content data. As used herein, "episode match score" relates to a comparison between a first linear or non-linear media's episode name and a second linear or non-linear media's episode name, represented in the form of a percentage, for example. Episode match scores that satisfy a threshold are sent to the matcher 318. For example, episode match scores greater than or equal to 65% for a single match meet the threshold and are sent to the match domain 318. Episode match scores less than 65% for a single match, or having scores of greater than or equal to 65% with respect to multiple pieces of media, do not meet the threshold and are sent to the content UI 320 where the media can be manually adjusted, for example.

The matcher 318 receives identification of media deemed to be a "successful match." As used herein, a successful match pertains to media that completes the process containing a distinguishable program name and a distinguishable episode name. The media received by the matcher 318 may also include originator network information. The matcher 318 generates a normalized media name for the media. The normalized media name (and other related information such as originator network information for the media content) can be provided to the algorithm trainer 110, for example. The normalized media name can be output in association with matching media content for analytics, reporting, etc.

The content UI 320 receives media deemed an "unreliable match." In certain examples, such media does not automatically receive a normalized media name without manual interference. As used herein, an "unreliable match" relates to media that does not include a distinguishable program name and/or distinguishable episode name as determined by the program score generator 310, the episode score generator 314, and/or the episode identification generator 316. The data in the content UI 320 enables a user to manually obtain a normalized media name for particular media by interacting with the displayed content UI 320, for example.

In certain examples, a pattern matching score is determined for program and/or episode match by the program score generator 310 and/or the episode score generator 314 as described above. A total score associated with matching one media to another media to assign both media the same normalized name can be determined as a combination or total of weighted scores.

While an example manner of implementing the apparatus 100 of FIG. 1 is illustrated in FIGS. 1-3, one or more of the elements, processes and/or devices illustrated in FIGS. 1-3 may be combined, divided, re-arranged, omitted, eliminated and/or implemented in any other way. Further, the example data receiver 102, the example name extractor 104, the example name cleaner 106, the example name matcher 108, the example algorithm trainer 110, the example data store 112 and/or, more generally, the example apparatus 100 of FIG. 1 may be implemented by hardware, software, firmware and/or any combination of hardware, software and/or firmware. Thus, for example, any of the example data receiver 102, the example name extractor 104, the example name cleaner 106, the example name matcher 108, the example algorithm trainer 110, the example data store 112 and/or, more generally, the example apparatus 100 of FIGS. 1-3 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data receiver 102, the example name extractor 104, the example name cleaner 106, the example name matcher 108, the example algorithm trainer 110, the example data store 112 and/or, more generally, the example apparatus 100 of FIGS. 1-3 is/are hereby expressly defined to include a tangible computer readable storage device or storage disk such as a memory, a digital versatile disk (DVD), a compact disk (CD), a Blu-ray disk, etc. storing the software and/or firmware. Further still, the example apparatus 100 of FIGS. 1-3 may include one or more elements, processes and/or devices in addition to, or instead of, those illustrated in FIGS. 1-3, and/or may include more than one of any or all of the illustrated elements, processes and devices.

Figure 6:
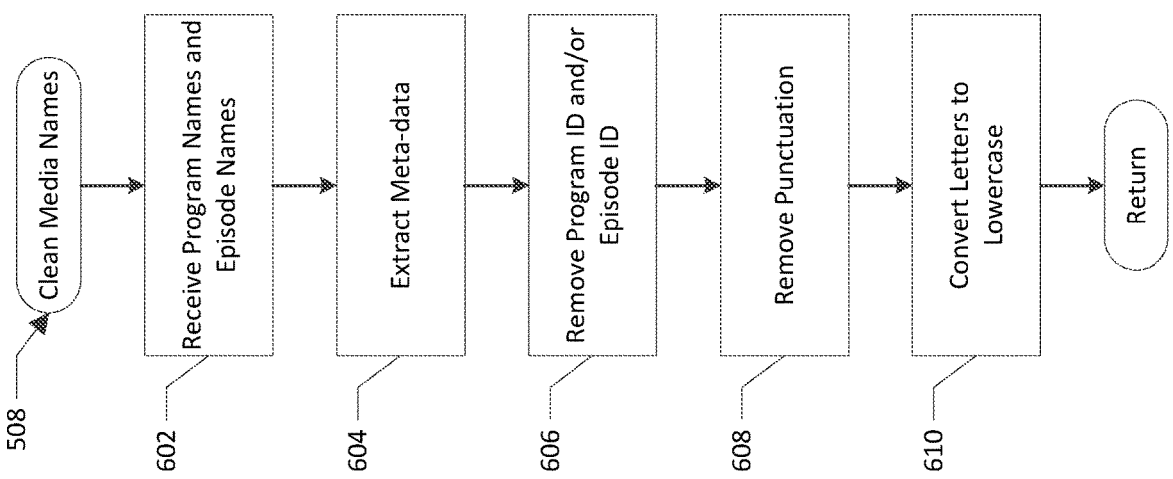
Figure 7:
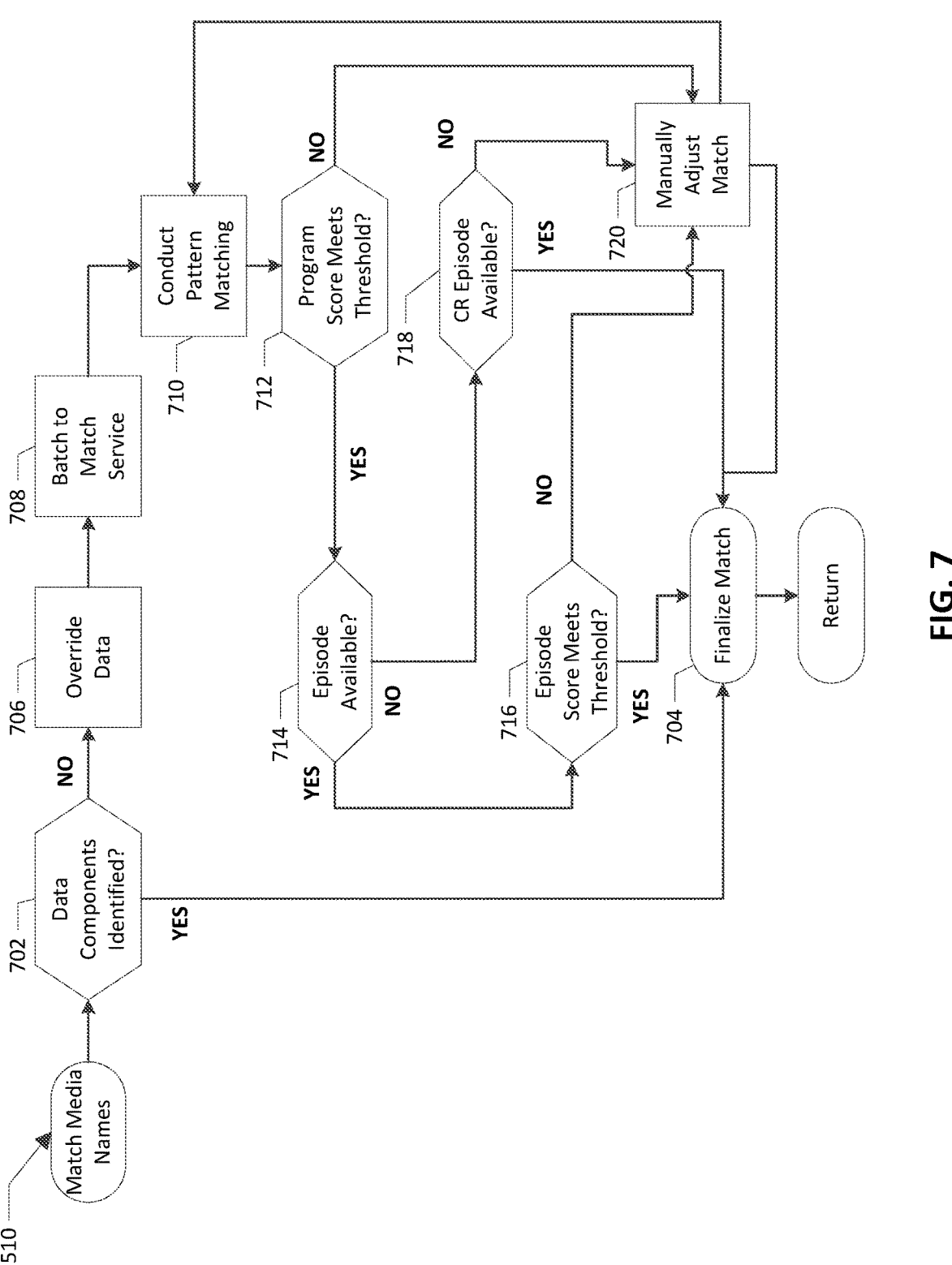

Flowcharts representative of example machine readable instructions for implementing the example apparatus 100 of FIGS. 1-3 are shown in FIGS. 5-7. In these examples, the machine readable instructions include program(s) for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 5-7, many other methods of implementing the example apparatus 100 may alternatively be used. For example, the order of execution of the blocks may be changed, and/or some of the blocks described may be changed, eliminated, or combined.

An example program 500 of FIG. 5 may be used to match and normalize media names in accordance with the teachings of this disclosure. The example program 500 of FIG. 5 begins at block 502 when the example data receiver 102 (FIG. 1) receives media data. The received media information (e.g., in the form of digital files, streamed media information, etc.) may include media content (e.g., a television program, video, etc.), program data and episode data for media content. For example, the data receiver 102 receives and/or may otherwise obtain television-broadcast program/episode data, television-cable program/episode data, television-syndicated program/episode data, video-on-demand program/episode data, digital-CMS (Content Management System) tagged program/episode data for television (TV) media, etc.

At block 504, the received media data is validated. For example, the data receiver 102 of the example of FIG. 1 may scrub a received digital media file to remove invalid rows (e.g., infomercials, adult content, promos, incomplete data, etc.). The data receiver 102 may also process digital, VOD, and/or TV data files, etc., to validate file format including rows, fields, encoding, etc. If the received media data cannot be validated, then control returns to block 502 for the data receiver 102 to request replacement/additional media data and/or to await new media data to be received.

If the received media data can be validated/scrubbed, then, at block 506, media name(s) are extracted from the media data via the example name extractor 104 (FIG. 1). The example name extractor 104 may extract meta-data (e.g., media name(s)) from received program data or episode data, for example. For example, the example name extractor 104 extracts linear media information, VOD media information, and/or other digital media information, etc., from data received by the example data receiver 102. Thus, for example, in addition to program/episode name and/or ID, season number, episode number, first air date, air time, etc., can be extracted from the received media data as name and/or associated metadata. In some examples, the extracted media name(s) may be recorded in the example data store 112.

At block 508, media name(s) are cleaned via the example name cleaner 106. The program names and episode names are cleaned across different types of media platforms. For example, the media cleaned at block 508 may include linear television media names, video-on-demand media names, digital media names, etc., from data extracted at block 504 via the example name extractor 104. The media is cleaned through the application of rules to normalize the program data and episode data, which improves matching accuracy. For example, meta-data, punctuation, capitalization, program name/ID, diacrits/accents, etc., can be removed to normalize or standardize media names. The example process of FIG. 6 provides additional and/or related detail regarding execution of block 508 of the example process 500 of FIG. 5 to clean media names.

At block 510, media names are matched via the name matcher 108. For example, the name matcher 108 analyzes and matches media names (e.g., via fuzzy logic and/or other pattern matching) and assigns confidence scores to the name match. The program data and episode data are matched with programs containing similar data, the matched data obtains a normalized media name for the media files, and the matched data receives a confidence score, for example. The matched data files are matched using pattern matching techniques implemented by the name matcher 108 on the data received from the name cleaner 106, for example. The names are matched via the name matcher 108, which pairs media that includes similar program data and/or episode data to create a new, normalized media name.

In the illustrated example of FIG. 5, the process implemented at block 510 identifies similar media across fragmented media (e.g., multiple devices where media is consumed such as tablets, smart phones, over-the-top devices, etc.). In some examples, normalized media names are automatically obtained at block 508 via the name matcher 108.

Pattern matching algorithms may be utilized to match media across one or more dimensions (e.g., characteristics) via one or more fuzzy logic algorithms. In some examples, at block 510, a user may be enabled (e.g., via content UI 318, etc.) to manually obtain the normalized media name for particular media if, for example, the name matcher 108 is unable to apply one or more pattern matching techniques and/or the pattern matching techniques do not conclusively yield a normalized name (e.g., not satisfying a match threshold, etc.). In some examples, the matched media names and/or associated data files may be stored in the example data store 112. The example process of FIG. 7 provides additional and/or related detail regarding execution of block 510 of the example process 500 of FIG. 5 to match media names.

In some examples, as part of the pattern matching to determine correspondence between media names for the same media content at block 510, a confidence score is assigned to the matched media names via the example name matcher 108. For example, a confidence score is a numerical value assigned to a normalized media name based on the similar content in the paired media. In some examples, assigning a confidence score includes assigning two numbers, a program match score and an episode match score. In some examples, assigning a confidence score classifies the normalized media names into one of three categories: a good match, a possible match, and a no match. In some examples, assigning a good match corresponds to identifying a normalized data file with a confidence score greater than or equal to 65%, assigning a possible match corresponds to identifying a normalized data file with a confidence score greater than or equal to 35%, and assigning a no match corresponds to identifying a normalized data file with a confidence score less than 35%.

At block 512, the name matcher determines whether the matching of media names (and associated generation of confidence score(s)) has resulted in feedback to be provided to a machine learning algorithm such as the pattern matching algorithm. If a machine learning algorithm is being used and feedback exists, then, at block 514, the pattern matching model is trained and/or otherwise improved to perform pattern matching based on matched names via the example algorithm trainer 110 of FIG. 1. Matched names may include automatically matched names and/or manually matched names. Pattern matching is performed via a pattern matching algorithm. The pattern matching algorithm takes the program names and the episode names from various data stores and utilizes fuzzy logic matching algorithms such as described above to determine a good match, probable match, no match, etc. The pattern matching algorithm matches on several dimensions (e.g., program name, episode name, etc.) to reconcile, match, and identify similar content across fragmented media and assign one normalized media name across the media. Such fuzzy logic and associated matching becomes more accurate over time as the model learns based on observed matching and verification behavior.

At block 516, the normalized, matching media name(s) are output for analysis, reporting, storage, etc. For example, information related to the normalized, matched media names can be provided to an audience measurement entity and/or other reporting and/or advertising system for total content ratings and/or other correlation to show a true reach of a particular media content across multiple channels, platforms, devices, etc. Output can be provided include normalized media name(s), digital file(s) including media content, associated metadata, control file(s), etc. Thus, available information regarding media content can be processed to identify matching media content based on that information, and audience measurement data for that matching media content can be aggregated under a standardized or normalized name for further analytics, reporting, behavior/system impact, etc.

As a result, the same media content is associated with the same name and/or identifier so that its viewing audience can be accurately measured. By normalizing the name or title of media content across platforms (e.g., the same content may have different names when broadcast on TV, viewed on demand via tablet, etc.), then duplicates can be identified and merged into the same record so that the audience measurement for that media content is aggregated and more accurate. That is, while content providers and advertisers may sometimes want to distinguish between tablet viewing and TV viewing or between cable viewing and satellite-based viewing, sometimes content providers want to know how many people viewed their content. The example process 500 (and associated system 100) help to facilitate this using a sliding time scale (e.g., exact air/viewing time, time within a threshold range, etc.) and fuzzy logic leveraging available information (e.g., air date and time, episode number, content originator, etc.) to match media content, provide a confidence score associated with that match, and normalize the name across matching media content.

In certain examples, normalized matching names, media content, metadata, etc., are stored at the data storage 112. The information (e.g., data files) is stored under the normalized media name. Storing the data via the example data store 112 of FIG. 1 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). Storing the data via the example data store 112 may additionally or alternatively be implemented by one or more double data rate (DDR) memories, such as DDR, DDR2, DDR3, mobile DDR (mDDR), etc. Storing the data via the example data store 112 may additionally or alternatively be implemented by one or more mass storage devices such as hard drive disk(s), compact disk drive(s), digital versatile disk drive(s), etc. While, in the illustrated example, storing the data via the example data store 112 is illustrated as a single database, the example data store 112 may be implemented by any number and/or type(s) of databases.

FIG. 6 illustrates further detail regarding an example implementation of the example process 500 at block 508 which cleans media names. The example process displayed in FIG. 6 cleans the program names and episode names across different types of media distribution platforms. As shown in FIG. 6, the process begins at block 602, at which program names and episode names are received (e.g., via data set 202) for media name(s) to be cleaned. The program names may be displayed in a program name field. The program name may correspond to a series of numbers and/or letters (e.g., The Daily Show). The episode names may be displayed in an episode name field. The episode name field may correspond to a series of numbers, letters, characteristics and/or program names. The data may also contain an episode ID. The episode ID is a series of numbers or letters used to represent a specific episode.

At block 604, meta-data is extracted via the meta-data extraction module 204. The data undergoing meta-data extraction is received from the data set 202. For example, meta-data may correspond to a season number, an episode number, an air-date, etc. Extracted meta-data is leveraged during the matching process to improve the accuracy of confidence scores (see FIG. 9). In some examples, the data input from data set 202 may contain information in the form of an episode name, a program name, and/or an episode ID/program ID.

At block 606, the data is processed to remove Program ID and/or Episode ID via the identifier (ID) removal module 206. The data undergoing Program ID/Episode ID removal is received from the meta-data extraction module 204. For example, a program ID/episode ID may include a series of numbers and/or letters identifying the program or episode.

At block 608, the data undergoes a process in which punctuation is removed from the data via the punctuation removal module 210. The data undergoing punctuation removal is received from the identifier (ID) removal module 206. At block 608, the punctuation is removed from the data input. Punctuation includes, but is not limited to, marks (e.g. comma, period, semicolon, parenthesis, etc.) used to separate words.

At block 610, the data undergoes a process in which letters are converted to a lowercase format via the letter conversion module 210. The data undergoing lowercase format conversion is received from the punctuation removal module 208. At block 610, capitalized letters present in the data are replaced with the same letter, in the lowercase form. The data is then output from the process in the converted form (e.g., adjusted data set 212), marking the end of the media name cleaning process 508 and returning to block 510 to process and match media names.

FIG. 7 illustrates further detail regarding an example implementation of the example process 500 at block 510 to match media names. The example implementation of the process 510 analyzes media data, determines a normalized name, and generates confidence score(s) via the name matcher 108. The example process displayed in FIG. 7 implements pattern matching algorithms to match program names and/or episode names via the name matcher 108 based on the identified media names in order to obtain a normalized media name for media content. The example process displayed in FIG. 7 matches media across one of more dimensions (e.g., characteristics). FIG. 7 further shows the process used to match program names and/or episode names for different media (e.g., linear television media and non-linear media).

As shown in the example of FIG. 7, the process begins with an input of data to block 702. The input data is the adjusted data set 212 shown in FIG. 2, for example. At block 702, the data is analyzed to identifying media content (e.g., TCR) data components. Data components include but are not limited to a network originator identifier, a program name identifier, and an episode name identifier. If, for example, the data components identifier 304 determines that all three of these data components are identifiable, then the data bypasses the matching data process of blocks 706-722 and is sent directly to the end of the process at block 704 to generate a match based on analysis of the data components.

At block 704, a match between first and second media content is finalized. For example, if a media data file received from a television audience monitor and a media data file received from an online audience monitor both include a network originator, program name, and episode name to indicate that both files are associated with media content from network A for program B and episode C, then the matcher 316 performs a fuzzy logic analysis (e.g., fuzzy string matching) and/or other comparison to determine with a degree of certainty (e.g., a confidence score) that the media content is the same. If the content matches, then both media files can be attributed to the same media content and organized under the same media name (e.g., program_a_e- pisode_c, etc.). Thus, the matcher 316 assigns the media data a normalized name to identify the media because the network originator, program name, and episode name can be used to ensure that the same media content is matched and associated with a common (e.g., normalized) name.

If, however, one or more of the data components are unknown and/or otherwise unavailable, then the data is sent to block 706 for further analysis. At block 706, the data is further analyzed by the data components identifier 304, overriding the media data with data components, such as a network originator identifier, a program name identifier, etc., from the reference data store 302. At block 708, the data is batched to a matching service 306. For example, multiple media content items and/or associated metadata can be matched for comparison, matching, and name normalization. At block 710, data for matching with the media data is obtained through an affiliated provider (e.g., Gracenote, Cognitive Networks, Digimarc, Shazam, etc.). For example, media content listings, etc., are obtained from the affiliated provider to facilitate matching of media content by the match service 306.

At block 712, pattern matching is performed on the data batched at block 708. In certain examples, pattern matching is performed by the match service 306 on two or more media content items from the batched data combined with further data provided from an affiliated provider (e.g., Gracenote, Cognitive Networks, Digimarc, Shazam, etc.), such as media content listings, air date/time, content originator, etc. Thus, rows of a media data file can be compared by the match service 306, alone or in conjunction with supplemental content from an affiliated provider to determine matching media content items. The comparison can be used to generate one or more scores including a program match score, an episode match score, a composite match score (e.g., including both the program and episode match scores), etc.

At block 714, the pattern matched data is analyzed by the program score generator 310, and each match receives a program match score. As used herein, "program match score" relates to a comparison between a first linear or non-linear media's program name and a second linear or non-linear media's program name, represented in the form of a percentage or other numerical value, for example. A higher percentage represents a higher degree of similarity between the first media's program name and the second media's program name. The program match score is evaluated with respect to a threshold in order to be sent for further examination. If the program match score for a given media content item is greater than or equal to 65% with respect to a single other media content item, for example, then the program match score for the media name match analysis meets the threshold and is sent to block 716 for further examination. If the program match score is less than 65% for a single other media content item, for example, or if the media content item under review achieves a score greater than or equal to 65% with respect to multiple pieces of other media content, for example, then the media does not meet the threshold and is sent to block 722 where it can be manually adjusted. The media is manually adjusted within the Content User Interface 320, for example.

At block 716, the data undergoes further analysis by the episode identifier 312 to determine if the media contains an episode name identifier. If an episode name identifier is present, then the media is sent to block 718 to receive and evaluate an episode match score. If the episode identifier 312 determines that the media does not include an episode name identifier, then the media is sent to block 720. At block 720, the data undergoes analysis by the episode identification generator 316 to determine if content ratings data containing an episode content identifier correlating to the given network originator identifier and program name identifier is available.

If the episode identification generator 316 determines that the CR data including an episode content identifier correlating to the given network originator identifier and program name identifier is available, then control shifts to block 704 where the data receives a normalized name to identify the media content. However, if the CR data including an episode content identifier correlating to the given network originator identifier and program name identifier is unavailable, then the media is sent to block 722 where it can be manually adjusted.

At block 718, the pattern matched data undergoes analysis and each match receives an episode match score. As used herein, "episode match score" relates to a comparison between a first linear or non-linear media's episode name and a second linear or non-linear media's episode name, represented in the form of a percentage. The episode match score is determined and evaluated by the episode score generator 314 with respect to a threshold in order to complete the process and receive a normalized name to identify the media. A higher percentage represents a higher degree of similarity between a first media's episode name and a second media's episode name. If the episode match score is greater than or equal to 65% when comparing the first and second media, for example, then the first and/or second media meets the threshold and is sent to the end of the process to receive a normalized name to identify the media. If the episode match score is less than 65% when comparing the first and second media, for example, or if the first media achieves a score greater than or equal to 65% with multiple pieces of media (e.g., second and third media), for example, then the first media does not meet the threshold and is sent to block 722, where the media can be manually adjusted.

As described above, media is sent to block 704 to finalize the match. The matcher 316 uses media data and associated score(s), as supplemented through blocks 706-722 to match media content with an associated confidence/composite score. For example, such media include a distinguishable program name and a distinguishable episode name. The matchable media may also include originator network information. At block 704, the matcher 318 associates the same media content with the same normalized media name for storage in the data store 112 and/or transmission to an external reporting and/or analytics service, for example.

Media sent to be manually adjusted at block 722 does not contain a reliable match and therefore, does not automatically receive a normalized media name. At block 722, conflicting, incomplete, and/or otherwise undetermined options are visually presented to a user via the content UI 320 for manual confirmation, correction, update, input, etc., for a normalized media name for particular media if the name matching process 510 is unable to automatically apply one or more pattern matching techniques and/or the pattern matching techniques do not yield a normalized name.

As an example, suppose sports game content is obtained from a Sports Station 1 where it is referred to as "Basketball Game 1" (block 502). The same sports game content may also be digitally streamed from a VOD platform, such as example SportsStation1.com where it is referred to as "Bball Game 1 1Chicago_28 a59440-ed0 1". The example data receiver 102 validates the data (block 504), and the example name extractor 104 extracts the media names (block 506). The example name cleaner 106 of FIG. 2 cleans the example program names and episode names from both Sports Station 1 and SportsStation1.com (block 508). The example name cleaner 106 extracts and/or removes meta-data, program ID and/or Episode ID, program names, punctuation and upper-case letters. Therefore, "Basketball Game 1" is cleaned to "basketball game 1" and "Bball Game 11Chicago_28 a59440-ed01" is cleaned to "bball game 1". The example name matcher 108 then matches the program names and/or episode names in order to obtain a normalized media name for the media files (block 510). The example name matcher 108 also assigns a confidence score to the matched data files containing a normalized media name. For example, the program names "basketball game 1" and "bball game 1" are matched and may be assigned an example program match score of 90% and an episode match score of 75%. Once successfully matched, the two example names "basketball game 1" and "bball game 1" may be given a normalized name of "BG 1" or "bg 1" for future matches.

FIG. 8 illustrates an example mapping 800 generated by the name matcher 108, its associated data components identifier 304 and match service 306, and blocks 510, 516 of associated process 500. As shown in the example mapping 800, a program match score 802, an episode match score 804, a TV originator ID 806, a TV originator name 808, a digital program name 810, a digital episode ID 812, a digital episode name 814, an affiliated provider program ID 816, an affiliated provider episode ID 818, an affiliated provide program name 820, and an affiliated provider episode name 822 can be provided and associated. Thus, information from the TV originator, digital conduit, and affiliated provider (e.g., Gracenote, Cognitive Networks, Digimarc, Shazam, etc.) can be mapped and compared in association with a determined program match score 802 and episode match score 804. As shown in the example of FIG. 8, all information may not be available and/or generated in some cases (e.g., affiliated provider episode ID 818, affiliated provider episode name 822, etc.), but program and/or episode match scores 802, 804 can still be calculated. However, as illustrated in the example mapping 800, certain entries have an episode match score 804 of 0 because the affiliated provider episode ID 818 and episode name 822 are unavailable for comparison. While the digital and affiliated program names 810, 820 match exactly (e.g., "FORENSICS"), the episode names 814, 822 cannot be compared. In other cases, however, shown in the mapping 800, all information is provided, enabling the system to evaluate episode name 814, 822 (e.g., "FORENSICS: THE DEFENDANT'S TURN" vs. "THE DEFENDANT'S TURN") as well as program name 810, 820 ("FORENSICS" vs. "FORENSICS". In such examples, shown in the mapping 800, the program names 810, 820 match exactly (100%) and the episode names 814, 822 are good, but not exact, matches (e.g., within a threshold at 85%, 95%, etc.).

The mapping 800 represents an example data file of entries to be analyzed and processed to determine media match(es). As described above, rows can be grouped by originator network 806, 808, and, for each originator grouping, the program match score 802 can be calculated for each row in the grouping (e.g., a fuzzy string match between digital/VOD program name 810 and affiliate/TV program name 820). If there is no match (e.g., program match score <35%, etc.), then a fuzzy string match between digital/VOD program name 810 and affiliate/TV episode name 822 can be evaluated.

If the program match score 802 is a good match (e.g., >=65%, etc.) or a possible match (e.g., >=35%, etc.), then the episode match score 804 is calculated for each row in the grouping (e.g., a fuzzy string match between digital/VOD episode name 814 and affiliate/TV episode name 822). If there is no match (e.g., episode match score <35%, etc.), then a fuzzy string match between digital/VOD episode name 814 and affiliate/TV program name 820 can be evaluated.

If the episode match score 804 is a good match (e.g., >=65%, etc.) or a possible match (e.g., >=35%, etc.), then a meta-data match is conducted based on one or more of first air date, season number, episode number, etc. A weighted average episode match score is calculated based on a combination of the above scores for episode name, season number, episode number, first air date, etc. If data does not exist, then it is not included in the weighted average. The combined weighted average episode match score is used to determine a successful match and to associate matching media with a normalized media name, for example.

FIG. 9 illustrates an example weighting and criteria 900 for pattern matching of media content according to FIGS. 1-8. The example weighting and criteria 900 includes a determination of whether an episode title exists 902, whether a season number exists 904, whether an episode number exists 906, whether an original air date exists 908, and weighting logic 910.

As described above, the weighting and criteria 900 can be used in determined program, episode, and/or total/composite match scores (e.g., blocks 704, 714, 718) to identify matching media items that are to be associated for reporting, rating, etc., under a common/standard/normalized media name/identifier. Weight(s) can be assigned based on the presence or absence of information (e.g., episode title 902, both episode title 902 and season number 904, episode title 902 and episode number 906, episode title 902 and season number 904 and episode number 906, etc.).

As shown in the example 900 of FIG. 9, certain combinations involve two-pass scoring. Certain weights apply during the first pass, but, if the score is less than a certain threshold, different weights apply on a second pass. For example, in one example, if the episode title 902 and original air date 908 exist, then the episode title is initially given a weight of 100%. However, if the resulting score is less than a threshold (e.g., 80%, etc.), then the episode title is weighted 910 at 85% and the original air date is weighted 910 at 15% for a second pass through score calculation.

In another example, if the episode title 902, season number 904, and original air date 908 exist, then the episode title is initially given a weight 910 of 90% and the season number weighted 10%. However, if the resulting score is less than a threshold (e.g., 80%, etc.), then the episode title is weighted 910 at 70%, the season number is weighted 910 at 15%, and the original air date is weighted 910 at 15% for a second pass through score calculation.

In another example, if the episode title 902, episode number 906, and original air date 908 exist, then the episode title is initially given a weight 910 of 90% and the episode number weighted 10%. However, if the resulting score is less than a threshold (e.g., 80%, etc.), then the episode title is weighted 910 at 70%, the episode number is weighted 910 at 15%, and the original air date is weighted 910 at 15% for a second pass through score calculation.

In another example, if the episode title 902, season number 904, episode number 906, and original air date 908 exist, then the episode title is initially given a weight 910 of 80% and the season number plus episode number are weighted at 20%. However, if the resulting score is less than a threshold (e.g., 80%, etc.), then the episode title is weighted 910 at 55%, the season number is weighted 910 at 15%, the episode number is weighted 910 at 15%, and the original air date is weighted 910 at 15% for a second pass through score calculation.

The example 900 of FIG. 9 also indicates that, in certain examples, if only a season number 904, episode number 906, or original airdate 908 exists, then the weight 910 should be a certain percentage (e.g., 50%, 80%, etc.) with a maximum score set for that single value. Similarly, if the episode title is absent, but other information such as season number 904, episode number 908, and/or original airdate 908 is present, then such information can be assigned certain weight with a maximum score set since episode title 902 is not included, as shown in the example of FIG. 9.

As mentioned above, the example processes of FIGS. 5-7 can be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. "Comprising" and all other variants of "comprise" are expressly defined to be open-ended terms. "Including" and all other variants of "include" are also defined to be open-ended terms. In contrast, the term "consisting" and/or other forms of "consist" are defined to be close-ended terms.

Figure 10:
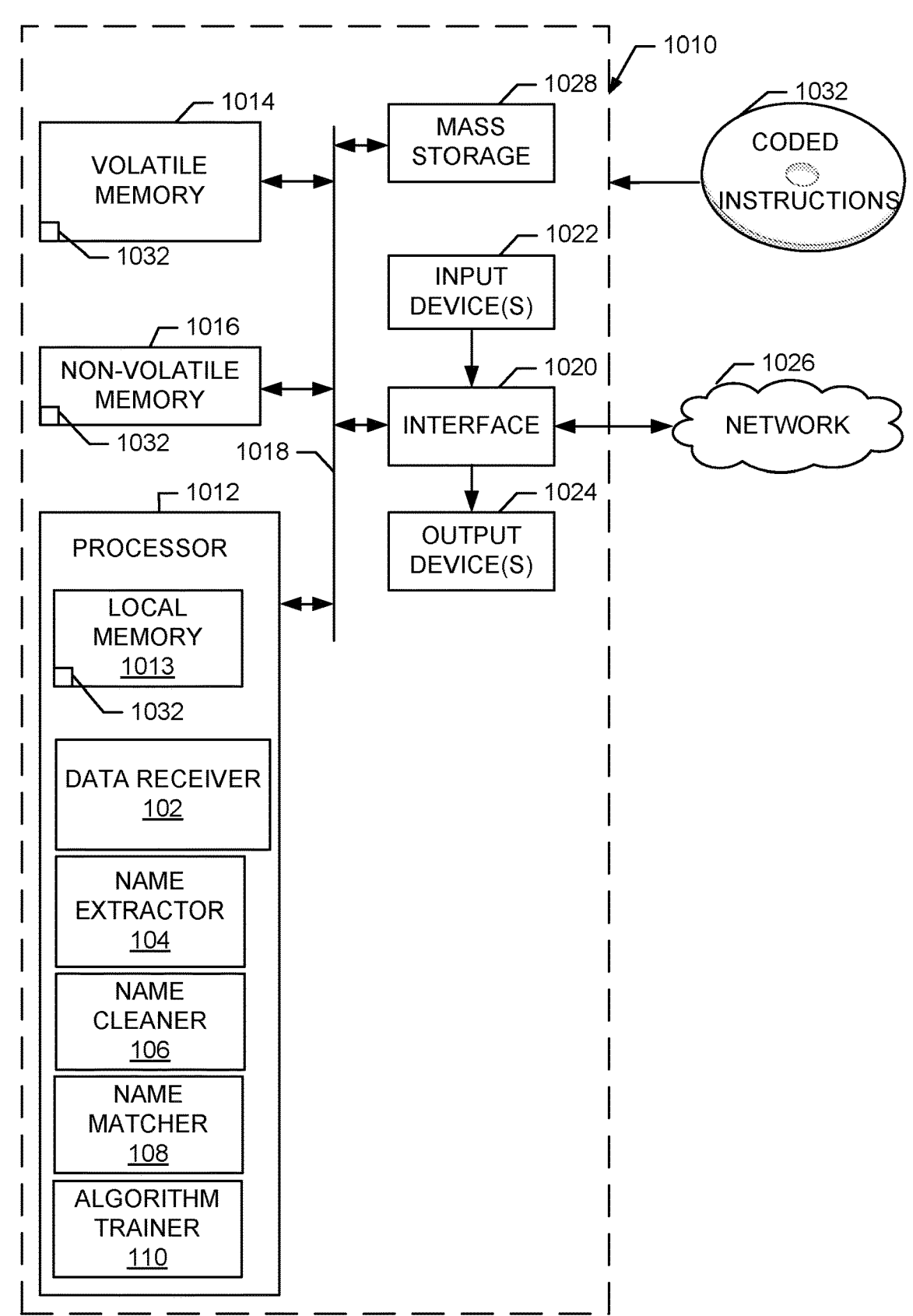
FIG. 10 is a schematic illustration of an example processor platform that may execute the instructions of FIGS. 5-7 to implement the example systems of FIGS. 1-3.

FIG. 10 is a block diagram of an example processor platform 1000 capable of executing the instructions of FIGS. 5-7 to implement the example apparatus 100 (and its components) of FIGS. 1-3. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1012. The processor 1012 of the illustrated example is hardware. For example, the processor 1012 can be implemented by one or more integrated circuits, logic circuits, microprocessors or controllers from any desired family or manufacturer. In the illustrated example, the processor 1012 is structured to include the example data receiver 102, name extractor 104, name cleaner 106, name matcher 108, algorithm trainer 110, and data store 112 of the example apparatus 100.

The processor 1012 of the illustrated example includes a local memory 1013 (e.g., a cache, data store 112, etc.). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller. The example data store 112 and/or reference data store 302 can be implemented by local memory 1013 and/or memory 1014, 1016, etc.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives. The example data store 112 and/or reference data store 302 can be implemented by the mass storage 1028 and/or an external data store accessible via the network 1026, for example.

Coded instructions 1032 representing the flow diagrams of FIGS. 5-7 may be stored in the mass storage device 1028, in the volatile memory 1014, in the non-volatile memory 1016, on a removable tangible computer readable storage medium such as a CD or DVD, and/or an external data store accessible via the network 1026, for example.

The example data store 112 and/or reference data store 302 can be implemented by mass storage device 1028, in the volatile memory 1014, in the non-volatile memory 1016, a removable tangible computer readable storage medium such as a CD or DVD, and/or an external data store accessible via the network 1026, for example.

Thus, certain examples provide a method including receiving first data related to a first media content; and analyzing the first data to identify at least a) a program name or identifier and b) an episode name or identifier associated with the first media content. In the example method, when at least one of a) the program name or identifier and b) the episode name or identifier is not identified in the first data, the first data is processed by: retrieving second data from an affiliated provider and supplementing the first data with the second data to form third data associated with the first media content; processing the third data with respect to fourth data associated with a second media content and calculating a composite match score including a program match score and an episode match score based on the processing of the third data with respect to the fourth data; when the first media content is determined to match the second media content based on the processing of the third data with respect to the fourth data and a comparison of the composite match score to a threshold is satisfied, generating a normalized media name for the first media content and the second media content; and outputting the normalized media name in association with the first media content.

Certain examples provide an apparatus including a data receiver to receive first data related to a first media content and a name matcher. The example name matcher is to analyze the first data to identify at least a) a program name or identifier and b) an episode name or identifier associated with the first media content; and when at least one of a) the program name or identifier and b) the episode name or identifier is not identified in the first data, process the first data. The example name matcher then processes the first data by: retrieving second data from an affiliated provider and supplementing the first data with the second data to form third data associated with the first media content; processing the third data with respect to fourth data associated with a second media content and calculating a composite match score including a program match score and an episode match score based on the processing of the third data with respect to the fourth data; when the first media content is determined to match the second media content based on the processing of the third data with respect to the fourth data and a comparison of the composite match score to a threshold is satisfied, generating a normalized media name for the first media content and the second media content; and outputting the normalized media name in association with the first media content.

Certain examples provide a tangible computer readable storage medium having instructions that, when executed, cause a machine to: receive first data related to a first media content; analyze the first data to identify at least a) a program name or identifier and b) an episode name or identifier associated with the first media content; and when at least one of a) the program name or identifier and b) the episode name or identifier is not identified in the first data, process the first data. The example instructions, when executed, cause the first data to be processed by: retrieving second data from an affiliated provider and supplementing the first data with the second data to form third data associated with the first media content; processing the third data with respect to fourth data associated with a second media content and calculating a composite match score including a program match score and an episode match score based on the processing of the third data with respect to the fourth data; when the first media content is determined to match the second media content based on the processing of the third data with respect to the fourth data and a comparison of the composite match score to a threshold is satisfied, generating a normalized media name for the first media content and the second media content; and outputting the normalized media name in association with the first media content.

From the foregoing, it will be appreciated that examples have been disclosed which allow media content having the same and/or different names, identifiers, etc., to be cleaned, analyzed, and compared (e.g., along with associated metadata) to determine matches between the underlying media content. Matching media content can then be associated with a normalized media name so that data accounting, reporting, etc., can be more accurate with respect to audience exposure to the same underlying media content, regardless of distribution/viewing channel, for example. Duplicative and unnecessary results can be avoided, resulting in increased accuracy and robustness.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A audience measurement computing system comprising:

a processor; and a non-transitory computer-readable storage medium, having stored thereon program instructions that, upon execution by the processor, cause performance of a set of operations comprising:

receiving a first media data associated with a first exposure via a first media platform, wherein the first exposure is associated with a first media name and associated first metadata;

receiving a second media data associated with a second exposure via a second media platform, different than the first media platform, wherein the second exposure is associated with a second media name and associated second metadata, the second media name different than the first media name;

using a machine learning model to determine, based on: (i) a relationship between the first media name and the second media name and (ii) a relationship between the associated first metadata and the associated second metadata, that the first media name and the second media name each map to a common, normalized media name corresponding to underlying media content, wherein using the machine learning model to determine that the first media name and the second media name each map to the common, normalized media name comprises:

generating the common, normalized media name based on a combination of respective weighted scores associated with (i) the relationship between the first media name and the second media name and (ii) the relationship between the associated first metadata and the associated second metadata;

determining an audience measurement rating for the underlying media content based on the first exposure via the first media platform and the second exposure via the second media platform, each of the first exposure via the first media platform and the second exposure via the second media platform mapping to the common, normalized media name; and outputting the common, normalized media name in association with reporting of the audience measurement rating.

2. The audience measurement computing system of claim 1, wherein the first metadata includes a start time and at least one of a season number or an episode number, the set of operations further comprising:

outputting the common, normalized media name for at least one of the first media name or the second media name.

3. The audience measurement computing system of claim 1, wherein the first media platform is one of: broadcast, cable, syndicated, or video-on-demand, and wherein the second media platform is digital media from over-the-top providers.

4. The audience measurement computing system of claim 2, the set of operations further comprising:

preprocessing the first media name by removing the at least one of the season number or the episode number from the first media name; and replacing at least one of the first media name or the second media name with the common, normalized media name.

5. The audience measurement computing system of claim 1, wherein the machine learning model is a trained pattern matching model that applies fuzzy logic to determine similarities between the first media name, the first metadata, the second media name, and the second metadata.

6. The audience measurement computing system of claim 5, wherein the trained pattern matching model uses a first scoring pass and a second scoring pass, wherein the first scoring pass applies a first weighting, and wherein the second scoring pass applies the first weighting or a second weighting.

7. The audience measurement computing system of claim 6, wherein when a score of the first scoring pass is greater than a threshold, the second scoring pass applies the first weighting, and wherein when the score of the first scoring pass is less than the threshold, the second scoring pass applies the second weighting.

8. A method comprising:

receiving a first media data associated with a first exposure via a first media platform, wherein the first exposure is associated with a first media name and associated first metadata;

receiving a second media data associated with a second exposure via a second media platform, different than the first media platform, wherein the second exposure is associated with a second media name and associated second metadata, the second media name different than the first media name;

using a machine learning model to determine, based on: (i) a relationship between the first media name and the second media name and (ii) a relationship between the associated first metadata and the associated second metadata, that the first media name and the second media name each map to a common, normalized media name corresponding to underlying media content, wherein using the machine learning model to determine that the first media name and the second media name each map to the common, normalized media name comprises:

generating the common, normalized media name based on a combination of respective weighted scores associated with (i) the relationship between the first media name and the second media name and (ii) the relationship between the associated first metadata and the associated second metadata;

determining an audience measurement rating for the underlying media content based on the first exposure via the first media platform and the second exposure via the second media platform, each of the first exposure via the first media platform and the second exposure via the second media platform mapping to the common, normalized media name; and outputting the common, normalized media name in association with reporting of the audience measurement rating.

9. The method of claim 8, wherein the first media platform is one of: broadcast, cable, syndicated, or video-on-demand, and wherein the second media platform is digital media from over-the-top providers.

10. The method of claim 8, further comprising:

preprocessing the first media name by removing the at least one of a season number or an episode number from the first media name; and replacing at least one of the first media name or the second media name with the common, normalized media name.

11. The method of claim 8, wherein the first metadata includes a start time and at least one of a season number or an episode number, further comprising:

outputting the common, normalized media name for at least one of the first media name or the second media name.

12. The method of claim 11, wherein using the machine learning model to determine that the first media name and the second media name each map to the common, normalized media name corresponding to the underlying media content comprises applying a trained pattern matching model that applies fuzzy logic to determine similarities between the first media name, the first metadata, the second media name, and the second metadata.

13. The method of claim 12, wherein the trained pattern matching model uses a first scoring pass and a second scoring pass, wherein the first scoring pass applies a first weighting, and wherein the second scoring pass applies the first weighting or a second weighting.

14. The method of claim 13, wherein when a score of the first scoring pass is greater than a threshold, the second scoring pass applies the first weighting, and, when the score of the first scoring pass is less than the threshold, the second scoring pass applies the second weighting.

15. An at least one non-transitory computer-readable storage medium, having stored thereon program instructions that, upon execution by a processor, cause performance of a set of operations comprising:

receiving a first media data associated with a first exposure via a first media platform, wherein the first exposure is associated with a first media name and associated first metadata;

receiving a second media data associated with a second exposure via a second media platform, different than the first media platform, wherein the second exposure is associated with a second media name and associated second metadata, the second media name different than the first media name;

using a machine learning model to determine, based on: (i) a relationship between the first media name and the second media name and (ii) a relationship between the associated first metadata and the associated second metadata, that the first media name and the second media name each map to a common, normalized media name corresponding to underlying media content, wherein using the machine learning model to determine that the first media name and the second media name each map to the common, normalized media name comprises:

generating the common, normalized media name based on a combination of respective weighted scores associated with (i) the relationship between the first media name and the second media name and (ii) the relationship between the associated first metadata and the associated second metadata;

determining an audience measurement rating for the underlying media content based on the first exposure via the first media platform and the second exposure via the second media platform, each of the first exposure via the first media platform and the second exposure via the second media platform mapping to the common, normalized media name; and outputting the common, normalized media name in association with reporting of the audience measurement rating.

16. The at least one non-transitory computer-readable storage medium of claim 15, the set of operations further comprising:

preprocessing the first media name by removing the at least one of a season number or an episode number from the first media name; and replacing at least one of the first media name or the second media name with the common, normalized media name.

17. The at least one non-transitory computer-readable storage medium of claim 15, wherein the first media platform is one of: broadcast, cable, syndicated, or video-on-demand, and wherein the second media platform is digital media from over-the-top providers.

18. The at least one non-transitory computer-readable storage medium of claim 15, wherein the first metadata includes a start time and at least one of a season number or an episode number, the set of operations further comprising:

outputting the common, normalized media name for at least one of the first media name or the second media name.

19. The at least one non-transitory computer-readable storage medium of claim 15, wherein using the machine learning model to determine that the first media name and the second media name each map to the common, normalized media name corresponding to the underlying media content comprises applying a trained pattern matching model that applies fuzzy logic to determine similarities between the first media name, the first metadata, the second media name, and the second metadata.

20. The at least one non-transitory computer-readable storage medium of claim 19, wherein the trained pattern matching model uses a first scoring pass and a second scoring pass; wherein the first scoring pass applies a first weighting and the second scoring pass applies the first weighting or a second weighting; wherein when a score of the first scoring pass is greater than a threshold, the second scoring pass applies the first weighting; and wherein when the score of the first scoring pass is less than the threshold, the second scoring pass applies the second weighting.

\* \* \* \* \*